United States Patent
DeMont

(10) Patent No.: US 11,432,463 B2
(45) Date of Patent: Sep. 6, 2022

(54) NUT HARVESTER WITH A REMOVABLE ASSEMBLY AND A METHOD OF REPLACING A REMOVABLE ASSEMBLY OF A NUT HARVESTER

(71) Applicant: Jackrabbit, Inc., Ripon, CA (US)

(72) Inventor: Robert DeMont, Ripon, CA (US)

(73) Assignee: Jackrabbit, Inc., Ripon, CA (US)

( * ) Notice: Subject to any disclaimer, the term of this patent is extended or adjusted under 35 U.S.C. 154(b) by 198 days.

(21) Appl. No.: 16/783,835

(22) Filed: Feb. 6, 2020

(65) Prior Publication Data
US 2020/0253123 A1    Aug. 13, 2020

Related U.S. Application Data

(60) Provisional application No. 62/803,011, filed on Feb. 8, 2019.

(51) Int. Cl.
*A01D 51/00*     (2006.01)
*A01D 69/03*     (2006.01)

(52) U.S. Cl.
CPC ........... *A01D 51/002* (2013.01); *A01D 69/03* (2013.01)

(58) Field of Classification Search
CPC ....... A01D 51/002; A01D 69/03; B65G 21/10
See application file for complete search history.

(56) References Cited

U.S. PATENT DOCUMENTS

| | | | |
|---|---|---|---|
| 530,262 A | 12/1894 | Distl et al. | |
| 622,035 A | 3/1899 | Bray | |
| 785,508 A | 3/1905 | Mason | |
| 800,690 A | 10/1905 | Stuart et al. | |
| 1,012,046 A | 12/1911 | Anderson | |
| 1,014,493 A | 1/1912 | Lauritzen et al. | |
| 1,418,899 A | 6/1922 | Acken | |
| 1,524,360 A | 1/1925 | Lauritzen | |
| 1,641,777 A | 9/1927 | Newhouse | |

(Continued)

FOREIGN PATENT DOCUMENTS

| | | |
|---|---|---|
| AU | 646931 B2 | 3/1994 |
| AU | 671168 B2 | 8/1996 |

(Continued)

OTHER PUBLICATIONS

Eller, Brandon, "Designs, Construction, and Testing of an Almond Harvester Pick-Up Belt Tensioning Mechanism," BioResource and Agricultural Engineering Department, California Polytechnic State University, San Luis Obispo, 2012.

*Primary Examiner* — Alicia Torres
*Assistant Examiner* — Matthew Ian Neal
(74) *Attorney, Agent, or Firm* — Blank Rome LLP

(57) ABSTRACT

Systems and methods for replacing a removable assembly from a harvester for collecting and separating harvested crop product from twigs, dirt, dust, and other debris. A removable assembly for picking up harvested crop product and a removable assembly for separating the picked up harvested crop product from twigs, dirt, dust, and other debris are mounted to be changed out quickly in the field. A removable pickup assembly is received for removably mounting in the harvester by an inclined slot formed in a sidewall of the harvester body frame, so that the removable pickup assembly with the worn belt is lifted up and out and a replacement removable pickup assembly with a new belt is dropped into its place.

24 Claims, 16 Drawing Sheets

(56) References Cited

U.S. PATENT DOCUMENTS

| | | | |
|---|---|---|---|
| 1,647,816 A | 11/1927 | Riddell | |
| 1,677,838 A | 7/1928 | Moiin | |
| 1,679,593 A | 8/1928 | Williamson et al. | |
| 1,699,718 A | 1/1929 | Robins | |
| 1,899,292 A | 2/1933 | Rienks | |
| 1,899,737 A | 2/1933 | Ulrich | |
| 1,941,147 A | 12/1933 | Johlige | |
| 1,950,210 A | 3/1934 | Anderson | |
| 2,055,630 A | 9/1936 | McLean | |
| 2,124,856 A | 7/1938 | Kohler | |
| 2,244,546 A | 6/1941 | Stockdale | |
| 2,257,352 A | 9/1941 | Silver | |
| 2,266,506 A | 12/1941 | Morse | |
| 2,350,332 A | 6/1944 | Albaugh, Sr. | |
| 2,357,892 A | 9/1944 | Grant | |
| 2,370,539 A | 2/1945 | Hodecker | |
| 2,417,921 A | 3/1947 | Fox | |
| 2,477,006 A | 7/1949 | Pierson | |
| 2,565,559 A | 8/1951 | Hurdelbrink | |
| 2,588,309 A | 3/1952 | Troyer | |
| 2,604,206 A | 7/1952 | Armer | |
| 2,618,385 A | 11/1952 | Silver et al. | |
| 2,624,458 A | 1/1953 | Molnau | |
| 2,632,290 A | 3/1953 | Anderson | |
| 2,670,846 A | 3/1954 | Rienks et al. | |
| 2,699,253 A | 1/1955 | Miller | |
| 2,743,813 A | 5/1956 | Erickson | |
| 2,786,574 A | 3/1957 | Clark | |
| 2,830,703 A | 4/1958 | Laase | |
| 2,915,180 A | 12/1959 | MacGillivray | |
| 2,949,189 A | 8/1960 | Haines | |
| 2,954,810 A | 10/1960 | Bond | |
| 2,966,267 A | 12/1960 | Dunbar | |
| 2,974,793 A | 3/1961 | Kuntz | |
| 2,976,550 A | 3/1961 | Silver et al. | |
| 3,010,522 A | 11/1961 | Oppel | |
| 3,217,346 A | 11/1965 | Silver et al. | |
| 3,260,314 A * | 7/1966 | Edwards | A01D 29/00 171/101 |
| 3,265,206 A | 8/1966 | Allen | |
| 3,267,502 A | 8/1966 | Wells | |
| 3,306,441 A | 2/1967 | Sanders et al. | |
| 3,353,947 A | 11/1967 | Kramer | |
| 3,367,494 A | 2/1968 | Peterson | |
| 3,451,084 A | 6/1969 | Silver | |
| 3,456,776 A | 7/1969 | Viene | |
| 3,473,615 A | 10/1969 | Harrell | |
| 3,738,483 A | 6/1973 | MacKenzie | |
| 3,747,149 A | 7/1973 | Tatyanko et al. | |
| 3,750,211 A | 8/1973 | Zaun et al. | |
| 3,757,946 A | 9/1973 | Berkowitz et al. | |
| 3,817,375 A | 6/1974 | Herkes | |
| 3,848,741 A | 11/1974 | Haley et al. | |
| 3,870,627 A | 3/1975 | Herkes | |
| 3,878,937 A | 4/1975 | Glaser et al. | |
| 3,985,233 A | 10/1976 | Sherman | |
| 4,037,723 A | 7/1977 | Wahl et al. | |
| 4,101,420 A | 7/1978 | Luginbuhl | |
| 4,102,502 A | 7/1978 | Vaplon et al. | |
| 4,202,542 A | 5/1980 | Lammers et al. | |
| 4,209,097 A | 6/1980 | Nordmark et al. | |
| 4,239,119 A | 12/1980 | Kroell | |
| 4,264,012 A | 4/1981 | Paradis | |
| 4,266,676 A | 5/1981 | Ruckstuhl et al. | |
| 4,301,930 A | 11/1981 | Smith | |
| 4,376,042 A | 3/1983 | Brown | |
| 4,377,401 A | 3/1983 | Laughlin | |
| 4,377,474 A | 3/1983 | Lindberg | |
| 4,430,210 A | 2/1984 | Tuuha | |
| 4,452,694 A | 6/1984 | Christensen et al. | |
| 4,471,876 A | 9/1984 | Stevenson, Jr. et al. | |
| 4,504,386 A | 3/1985 | Dyren et al. | |
| 4,538,734 A | 9/1985 | Gill | |
| 4,563,926 A | 1/1986 | Boardman | |
| 4,579,652 A | 4/1986 | Bielagus | |
| 4,600,106 A | 7/1986 | Minardi | |
| 4,606,494 A | 8/1986 | Kroell | |
| 4,633,956 A | 1/1987 | Glifberg et al. | |
| 4,653,648 A | 3/1987 | Bielagus | |
| 4,658,964 A | 4/1987 | Williams | |
| 4,658,965 A | 4/1987 | Smith | |
| 4,703,860 A | 11/1987 | Gobel et al. | |
| 4,741,444 A | 5/1988 | Bielagus | |
| 4,755,286 A | 7/1988 | Bielagus | |
| 4,760,925 A | 8/1988 | Stehle et al. | |
| 4,789,068 A | 12/1988 | Gilmore | |
| 4,795,036 A | 1/1989 | Williams | |
| 4,798,508 A | 1/1989 | Lewis | |
| 4,836,388 A | 6/1989 | Bielagus | |
| 4,844,351 A | 7/1989 | Holloway | |
| 4,853,112 A | 8/1989 | Brown | |
| 4,871,073 A | 10/1989 | Berry et al. | |
| 4,901,863 A | 2/1990 | Lancaster | |
| 4,901,864 A | 2/1990 | Daugherty | |
| 4,903,845 A | 2/1990 | Artiano | |
| 4,915,824 A | 4/1990 | Surtees | |
| 4,946,046 A | 8/1990 | Affleck et al. | |
| 4,972,959 A | 11/1990 | Bielagus | |
| 4,972,960 A | 11/1990 | Bielagus | |
| 5,001,893 A * | 3/1991 | Stanley | A01D 51/002 56/16.5 |
| 5,012,933 A | 5/1991 | Artiano | |
| 5,022,514 A | 6/1991 | Lofberg | |
| 5,024,335 A | 6/1991 | Lundell | |
| 5,025,929 A | 6/1991 | Carrera | |
| 5,032,255 A | 7/1991 | Jauncey | |
| 5,037,537 A | 8/1991 | Bielagus | |
| 5,051,172 A | 9/1991 | Gilmore | |
| 5,058,727 A | 10/1991 | Jahns et al. | |
| 5,058,751 A | 10/1991 | Artiano | |
| 5,060,806 A | 10/1991 | Savage | |
| 5,074,992 A | 12/1991 | Clinton | |
| 5,078,274 A | 1/1992 | Brown | |
| 5,108,589 A | 4/1992 | Sherman | |
| 5,116,486 A | 5/1992 | Pederson | |
| 5,136,832 A | 8/1992 | Sund | |
| 5,152,402 A | 10/1992 | Matula | |
| 5,159,734 A | 11/1992 | Whitt et al. | |
| 5,163,564 A | 11/1992 | Matula | |
| 5,174,435 A | 12/1992 | Dorner et al. | |
| 5,211,281 A | 5/1993 | Aimes | |
| 5,232,097 A | 8/1993 | Tohkala | |
| 5,234,109 A | 8/1993 | Pederson | |
| 5,236,093 A | 8/1993 | Marrs | |
| 5,257,699 A | 11/1993 | Fricker et al. | |
| 5,263,591 A | 11/1993 | Taormina et al. | |
| 5,287,977 A | 2/1994 | Tirschler | |
| 5,298,119 A | 3/1994 | Brown | |
| 5,305,891 A | 4/1994 | Bielagus | |
| 5,344,025 A | 9/1994 | Tyler et al. | |
| 5,361,909 A | 11/1994 | Gemmer | |
| 5,377,848 A | 1/1995 | Jokinen et al. | |
| 5,386,914 A | 2/1995 | Eramaia et al. | |
| 5,395,057 A | 3/1995 | Williams, Jr. et al. | |
| 5,421,147 A * | 6/1995 | Holden | A01D 51/002 209/139.2 |
| 5,423,430 A | 6/1995 | Zaffiro et al. | |
| 5,425,459 A | 6/1995 | Ellis et al. | |
| 5,427,228 A | 6/1995 | Delsanto | |
| 5,450,966 A | 9/1995 | Clark et al. | |
| 5,465,847 A | 11/1995 | Gilmore | |
| 5,480,034 A | 1/1996 | Kobayashi | |
| 5,484,247 A | 1/1996 | Clark et al. | |
| 5,485,925 A | 1/1996 | Miller et al. | |
| 5,493,796 A | 2/1996 | Ballew et al. | |
| 5,503,712 A | 4/1996 | Brown | |
| 5,506,123 A | 4/1996 | Chieffalo et al. | |
| RE35,331 E | 9/1996 | Sherman | |
| 5,555,985 A | 9/1996 | Kobayashi | |
| 5,558,234 A | 9/1996 | Mobley | |
| 5,560,496 A | 10/1996 | Lynn | |
| 5,582,300 A | 12/1996 | Kobayashi | |
| 5,590,792 A | 1/1997 | Kobayashi | |
| 5,626,239 A | 5/1997 | Kobayashi | |

(56) References Cited

U.S. PATENT DOCUMENTS

| | | | |
|---|---|---|---|
| 5,697,451 A | 12/1997 | Nicholson | |
| 5,733,592 A | 3/1998 | Wettstein et al. | |
| 5,740,922 A | 4/1998 | Williams | |
| 5,799,801 A | 9/1998 | Clark et al. | |
| 5,824,356 A | 10/1998 | Silver et al. | |
| 5,826,703 A | 10/1998 | Altemus, Jr. et al. | |
| 5,887,515 A | 3/1999 | Kunstmann et al. | |
| 5,887,810 A | 3/1999 | Maruyama | |
| 5,901,856 A | 4/1999 | Brantley, Jr. et al. | |
| 5,913,268 A | 6/1999 | Jackson et al. | |
| 5,957,306 A | 9/1999 | Hoffman | |
| 5,960,964 A | 10/1999 | Austin et al. | |
| 5,967,333 A | 10/1999 | Smith | |
| RE36,537 E | 2/2000 | Sommer, Jr. et al. | |
| 6,053,330 A | 4/2000 | Lavoie | |
| 6,076,684 A | 6/2000 | Bollegraaf | |
| 6,079,929 A | 6/2000 | Muma et al. | |
| 6,110,242 A | 8/2000 | Young | |
| 6,144,004 A | 11/2000 | Doak | |
| 6,149,018 A | 11/2000 | Austin et al. | |
| 6,193,054 B1 | 2/2001 | Henson et al. | |
| 6,196,394 B1 | 3/2001 | Sieg et al. | |
| 6,234,292 B1 | 5/2001 | Schut | |
| 6,237,778 B1 | 5/2001 | Weston | |
| 6,241,100 B1 | 6/2001 | Tanner et al. | |
| 6,250,472 B1 | 6/2001 | Grubbs et al. | |
| 6,250,477 B1 | 6/2001 | Swanink | |
| 6,250,478 B1 | 6/2001 | Davis | |
| 6,318,560 B2 | 11/2001 | Davis | |
| 6,360,678 B1 | 3/2002 | Komatsu et al. | |
| 6,371,305 B1 | 4/2002 | Austin et al. | |
| 6,375,565 B1 | 4/2002 | Tanner et al. | |
| 6,390,915 B2 | 5/2002 | Brantley et al. | |
| 6,460,706 B1 | 10/2002 | Davis | |
| 6,513,641 B1 | 2/2003 | Affaticati et al. | |
| 6,523,678 B2 | 2/2003 | Roessler et al. | |
| 6,619,473 B2 | 9/2003 | Romeo | |
| 6,648,145 B2 | 11/2003 | Davis et al. | |
| 6,702,104 B2 | 3/2004 | Bollegraaf | |
| 6,705,433 B2 | 3/2004 | McQuaid et al. | |
| 6,708,813 B2 | 3/2004 | Takahashi | |
| 6,715,598 B2 | 4/2004 | Affaticati et al. | |
| 6,726,028 B2 | 4/2004 | Visscher et al. | |
| 6,811,018 B2 | 11/2004 | Cotter et al. | |
| 6,834,447 B1 | 12/2004 | Currey | |
| 6,860,383 B2 | 3/2005 | Veit et al. | |
| 6,918,484 B2 | 7/2005 | Affaticati et al. | |
| 7,093,709 B2 | 8/2006 | Cotter et al. | |
| 7,121,398 B2 | 10/2006 | Affaticati et al. | |
| 7,124,876 B2 | 10/2006 | Wolf | |
| 7,316,181 B2 | 1/2008 | Augusto et al. | |
| 7,412,817 B2 * | 8/2008 | Flora | A01D 51/002 56/328.1 |
| 7,445,122 B2 | 11/2008 | Currey | |
| 7,467,708 B2 | 12/2008 | McGettigan et al. | |
| 7,472,788 B2 | 1/2009 | Bonora et al. | |
| 7,549,544 B1 | 6/2009 | Currey | |
| 7,556,144 B2 | 7/2009 | Cotter et al. | |
| 7,562,760 B2 | 7/2009 | Affaticati et al. | |
| 7,578,396 B2 | 8/2009 | Garzon | |
| 7,661,537 B1 | 2/2010 | Sewell | |
| 7,677,396 B2 | 3/2010 | Visscher et al. | |
| 7,681,710 B2 | 3/2010 | Kuhn et al. | |
| 7,681,718 B2 | 3/2010 | Stebnicki et al. | |
| 7,699,734 B2 | 4/2010 | Lohrentz | |
| 7,788,891 B2 | 9/2010 | Puryk et al. | |
| 7,806,254 B2 | 10/2010 | Brayman et al. | |
| 7,942,273 B2 | 5/2011 | Campbell et al. | |
| 8,096,408 B2 | 1/2012 | Deyanov et al. | |
| 8,127,933 B2 | 3/2012 | Bohlig et al. | |
| 8,136,672 B2 | 3/2012 | Bjornson et al. | |
| 8,141,698 B2 | 3/2012 | Pietsch | |
| 8,146,489 B2 | 4/2012 | Turatti | |
| 8,191,714 B2 | 6/2012 | Kalverkamp | |
| 8,196,737 B2 | 6/2012 | Brayman et al. | |
| 8,231,011 B1 | 7/2012 | Currey | |
| 8,307,987 B2 | 11/2012 | Miller et al. | |
| 8,328,126 B2 | 12/2012 | Bruggencate | |
| 8,336,714 B2 | 12/2012 | Campbell et al. | |
| 8,356,715 B2 | 1/2013 | Brasseur | |
| 8,376,130 B2 | 2/2013 | Deyanov et al. | |
| 8,424,684 B2 | 4/2013 | Campbell et al. | |
| 8,459,466 B2 | 6/2013 | Duffy et al. | |
| 8,517,181 B1 | 8/2013 | Davis et al. | |
| 8,522,983 B2 | 9/2013 | Davis | |
| 8,544,250 B2 | 10/2013 | Lovett et al. | |
| 8,646,615 B2 | 2/2014 | Bruggencate et al. | |
| 8,683,918 B1 | 4/2014 | Witham et al. | |
| 8,695,315 B2 | 4/2014 | Coon et al. | |
| 8,800,781 B1 | 8/2014 | Carlile, Jr. et al. | |
| 8,857,621 B2 | 10/2014 | Campbell et al. | |
| 8,874,257 B2 | 10/2014 | Sinram et al. | |
| 8,893,409 B1 | 11/2014 | Rossi, Jr. | |
| 8,939,292 B2 | 1/2015 | Doppstadt et al. | |
| 9,027,762 B2 | 5/2015 | Davis et al. | |
| 9,485,915 B2 * | 11/2016 | Rittershofer | A01D 41/14 |
| 9,775,294 B2 * | 10/2017 | Bertino | A01D 51/002 |
| 9,788,488 B2 * | 10/2017 | Bertino | A01D 51/002 |
| 10,111,385 B2 | 10/2018 | DeMont et al. | |
| 10,257,980 B1 * | 4/2019 | Savage | A01D 61/008 |
| 10,723,556 B1 * | 7/2020 | Jager | A01D 51/002 |
| 2003/0089645 A1 | 5/2003 | Backers | |
| 2003/0116486 A1 | 6/2003 | Davis | |
| 2003/0183561 A1 | 10/2003 | Smook | |
| 2004/0035764 A1 | 2/2004 | Kreft et al. | |
| 2004/0069693 A1 | 4/2004 | Paladin | |
| 2004/0079684 A1 | 4/2004 | Davis et al. | |
| 2004/0188329 A1 | 9/2004 | Visscher et al. | |
| 2005/0056524 A1 | 3/2005 | Cotter et al. | |
| 2005/0126057 A1 | 6/2005 | Currey | |
| 2005/0242006 A1 | 11/2005 | Bohlig et al. | |
| 2006/0021915 A1 | 2/2006 | Biornson et al. | |
| 2006/0081513 A1 | 4/2006 | Kenny | |
| 2006/0081514 A1 | 4/2006 | Kenny | |
| 2006/0085212 A1 | 4/2006 | Kenny | |
| 2006/0163120 A1 | 7/2006 | Doppstadt et al. | |
| 2006/0180524 A1 | 8/2006 | Duncan et al. | |
| 2006/0226054 A1 | 10/2006 | Bishop, Jr. | |
| 2006/0272930 A1 | 12/2006 | Cotter et al. | |
| 2007/0034478 A1 | 2/2007 | Wolf | |
| 2007/0108026 A1 | 5/2007 | McGettigan | |
| 2007/0187211 A1 | 8/2007 | Vertogen et al. | |
| 2010/0264069 A1 | 10/2010 | Green et al. | |
| 2011/0073441 A1 | 3/2011 | Dale | |
| 2012/0110971 A1 | 5/2012 | Monchiero et al. | |
| 2014/0202933 A1 | 7/2014 | Benjamins | |
| 2014/0263770 A1 | 9/2014 | Hissong et al. | |
| 2014/0331629 A1 | 11/2014 | Dagorret | |
| 2016/0167885 A1 | 6/2016 | Westergaard Andersen | |
| 2019/0183051 A1 * | 6/2019 | Matsuo | A01D 51/002 |

FOREIGN PATENT DOCUMENTS

| | | |
|---|---|---|
| BE | 511963 | 1/1954 |
| CA | 2054615 A1 | 5/1992 |
| DE | 592 126 | 2/1934 |
| DE | 609 919 | 2/1935 |
| DE | 618 154 | 9/1935 |
| DE | 640 551 | 1/1937 |
| DE | 3027651 A1 | 3/1982 |
| DE | 3636668 A1 | 5/1988 |
| DE | 3926451 C1 | 3/1991 |
| DE | 4339510 C1 | 1/1995 |
| DE | 29803880 U1 | 4/1998 |
| DE | 19857498 C1 | 6/2000 |
| EP | 0132217 A2 | 1/1985 |
| EP | 0382676 A1 | 8/1990 |
| EP | 0410807 A1 | 1/1991 |
| EP | 0410808 A2 | 1/1991 |
| EP | 0773070 A1 | 5/1997 |
| EP | 0818406 A1 | 1/1998 |
| EP | 1005918 A2 | 6/2000 |
| EP | 1584580 A1 | 10/2005 |
| EP | 1607349 A1 | 12/2005 |

(56) References Cited

FOREIGN PATENT DOCUMENTS

| | | |
|---|---|---|
| EP | 1785199 A2 | 5/2007 |
| EP | 2436255 A1 | 4/2012 |
| GB | 754400 A | 8/1956 |
| GB | 878 492 | 10/1961 |
| GB | 2 145 612 | 10/1985 |
| GB | 2 222 507 | 8/1993 |
| GB | 2 356 547 | 5/2001 |
| GB | 2 407 469 | 4/2006 |
| SU | 1764712 A1 | 9/1992 |
| WO | WO-8900893 A1 | 2/1989 |
| WO | WO-9216311 A1 | 10/1992 |
| WO | WO-9714514 A1 | 4/1997 |
| WO | WO-9738568 A1 | 10/1997 |
| WO | WO-0007743 A1 | 2/2000 |
| WO | WO-03026384 A1 | 4/2003 |
| WO | WO-2007112593 A1 | 10/2007 |

\* cited by examiner

NUT HARVESTER WITH A REMOVABLE ASSEMBLY AND A METHOD OF REPLACING A REMOVABLE ASSEMBLY OF A NUT HARVESTER

CROSS REFERENCE TO RELATED APPLICATION

This application claims the benefit of U.S. Provisional Application No. 62/803,011, filed Feb. 8, 2019, the subject matter of which is incorporated in its entirety by reference herein.

BACKGROUND

The present disclosure relates generally to systems for collecting and separating materials and to methods related to replacing removable assemblies of the systems. In particular, the present disclosure relates to harvesters and removable assemblies for collecting and separating various crops, for example tree nuts, from twigs, dirt, dust, and other debris.

Some harvesters presently on the market use various pickup and screening/roller configuration to pick up and separate debris from harvested crop product.

Separation of the debris from the crop at or near the location of harvesting may decrease the weight of the harvested crop and thus the cost of transportation, decrease the cost of disposal of the debris because it may be left in or near the harvesting location, and decrease the likelihood of contamination of the harvested product with the debris during transport. These screening/roller separator assemblies may have a series of rotating spaced parallel shafts, each of which has a series of disks. The screening/roller separator assemblies permit debris to pass downward through spaces between disks, while the harvested crop product remains over the disks and advances out of the screening/roller separator assembly to a collector. U.S. Pat. No. 10,111,385 (the '385 patent), issued on Oct. 30, 2018, the contents of which is hereby incorporated by reference in its entirety and attached hereto as Exhibit A, presents an example of a known harvester.

A problem with known harvesters is the wearing of pickup or separating configuration components. Pickup configurations can include a number of wear components, e.g., brushes, which contact the ground and lift harvest crop product and associated debris into a screening/roller configuration for separation. Pickup configurations also may include flexible belts for driving the rotation of pickup components, and other components that are subject to wear and degradation over time.

Similarly, screening/roller configuration for separation can include a number of wear components, e.g., disks, which contact the harvest crop and associated debris and wear as the associated debris separated from the harvest crop passes downward. It is time consuming to replace such components, e.g., belt, disks, brushes, wear parts, when the components break, become jammed, or otherwise require service or replacement. And service and replacement often requires taking a harvester out of commission for long periods of time, reducing the overall efficiency of the harvest.

SUMMARY

In one aspect of the present disclosure, a nut harvester is provided with a removable assembly that may be replaced in the field. In another aspect of the present disclosure, a method of replacing a removable assembly in the field is provided.

An exemplary nut harvester of the present invention includes a removable pickup assembly and a removable separator assembly that may be removed from the nut harvester by decoupling a motor mounted to the respective assembly for driving one of the shafts of the assemblies, and removing the respective assembly from the nut harvester. A replacement pickup assembly and/or separator assembly may be placed into the place of the removed pickup assembly and/or separator assembly, removably connected to the body frame of the nut harvester and coupled with the motor. Such replacement mechanism and method provides an easy and simple way to replace in the field a removable pickup assembly and/or a removable separator assembly of a nut harvester.

In one feature of the disclosure, a nut harvester is described having a body frame and at least one removable assembly. In another feature of the disclosure, a removable assembly is a removeable pickup assembly. In another feature of the disclosure, a removable assembly is a removeable separator assembly. In yet another feature of the disclosure, a removable pickup assembly includes a pickup assembly drive shaft, a pickup assembly idle shaft, a belt wrapped around the pickup assembly drive shaft and the pickup assembly idle shaft, and a stretcher assembly providing tension and support to the pickup assembly drive shaft and the pickup assembly idle shaft.

In one feature of the disclosure, a stretcher assembly includes a stretcher assembly side plate adapted for mounting the pickup assembly drive shaft and the pickup assembly idle shaft to the stretcher assembly side plate. In another feature of the disclosure, a stretcher assembly includes a closed bracket attached to the stretcher assembly side plate and to which the pickup assembly idle shaft is secured via an idle shaft bearing block. In another feature of the disclosure, a stretcher assembly includes an open bracket attached to the stretcher assembly side plate and to which the pickup assembly drive shaft is secured via a drive shaft bearing block. In yet another feature of the disclosure, a stretcher assembly includes a stretcher rod penetrating a closed bracket and attached to an open bracket. In another aspect of the disclosure, a stretcher assembly includes a stretcher nut adapted to engage the stretcher rod such that rotation of the stretcher rod adjusts the distance between the closed bracket and the open bracket to adjust the tension between the pickup assembly idle shaft and the pickup assembly drive shaft.

In one feature of the disclosure, a nut harvester includes a pickup assembly motor. In another aspect of the disclosure, a pickup assembly motor is a pickup assembly hydraulic motor. In one aspect of the disclosure, a pickup assembly torque arm is connected to a pickup assembly motor and the pickup assembly torque arm includes a pickup assembly torque arm slot. In yet another aspect of the disclosure, a pickup assembly torque arm includes a pickup assembly torque arm mounting end attached to a pickup assembly motor, and a pickup assembly torque arm slot end in which a pickup assembly torque arm slot is formed. In one aspect of the disclosure, an opening of the pickup assembly torque arm slot is wider than a size of a pickup assembly torque arm pin inserted into the pickup assembly torque arm slot. In another aspect of the disclosure, a pickup assembly torque arm slot is elongated to tolerate a movement of the pickup assembly motor with respect to the pickup assembly torque arm pin. In another aspect of the disclosure, a pickup assembly motor coupler couples the pickup assembly motor to the pickup assembly drive shaft.

In one aspect of the disclosure, a removable separator assembly includes a separator assembly side plate, a separator assembly drive shaft, and at least one separator assembly shaft. In another aspect of the disclosure, a removable separator assembly includes at least two disks mounted on each of at least two separator assembly shafts. In yet another aspect of the disclosure, a separator assembly motor is included. In one aspect of the disclosure, a separator assembly motor is a separator assembly hydraulic motor. In another feature of the disclosure, a nut harvester includes a separator assembly torque arm connected to a separator assembly motor, the separator assembly torque arm including a separator assembly torque arm slot. In another aspect of the disclosure, a separator assembly torque arm includes a separator assembly torque arm mounting end attached to a separator assembly motor. In another aspect of the disclosure a separator assembly torque arm includes a separator assembly torque arm slot end in which a separator assembly torque arm slot is formed. In another aspect of the disclosure, an opening of a separator assembly torque arm slot is wider than a size of a separator assembly torque arm pin inserted into the separator assembly torque arm slot.

In one aspect of the disclosure, a separator assembly torque arm slot is elongated to tolerate a movement of the separator assembly motor with respect to a roller assembly torque arm pin. In another aspect of the disclosure, a nut harvester includes a separator assembly motor coupler coupling a separator assembly motor to a separator assembly drive shaft. In another aspect of the disclosure, a nut harvester includes a removable separator assembly. In yet another aspect of the disclosure, a nut harvester includes a body frame, the body frame including a pickup assembly support on which a removable pickup assembly is adapted to rest, and a mounting rail, where the mounting rail includes an inclined slot adapted to receive a removable pickup assembly; and, the pickup assembly torque arm pin. In yet another aspect of the disclosure, a frame includes a mounting ear to which a stretcher assembly is removably mounted and a mounting slot to which an attachment surface formed on a separator assembly side plate is removably mounted. In another aspect of the disclosure, a nut harvester includes a separator assembly torque arm pin for insertion into a separator assembly torque arm.

In one aspect of the disclosure, a method of replacing a removable assembly of a nut harvester is disclosed. In one aspect of the disclosure, a method of replacing a removable assembly of a nut harvester includes decoupling a motor from a shaft of a removable assembly, removing the removable assembly from the nut harvester by unmounting the removable assembly from a body frame of the nut harvester, mounting a replacement removable assembly to the body frame of the nut harvester, and coupling the motor to a shaft of the replacement removable assembly. In one feature of the disclosure, a method includes removing one or more cover panels from the body frame of a nut harvester. In another feature of the disclosure, a motor is a hydraulic motor. In yet another feature of the disclosure, a step of removing a removable assembly includes lifting up an unmounted removable assembly from an inclined slot formed on a body frame and removing the lifted up removable assembly out of a nut harvester. In one aspect of the disclosure, a step of mounting of a replacement removable assembly includes placing the replacement removable assembly into an inclined slot before removably mounting the replacement removable assembly to a body frame.

In another feature of the disclosure, a harvester is disclosed having a harvester frame, having sidewalls, the sidewalls having inclined slots; and a pick-up and/or separator assembly cassette received for mounting in the harvester frame by the inclined slots, so that the cassette is adapted to be lifted up and out and a replacement cassette dropped into its place.

These and other features and advantages will be more clearly understood from the following detailed description and drawing of embodiments of the present application.

DETAILED DESCRIPTION

Figure 1:
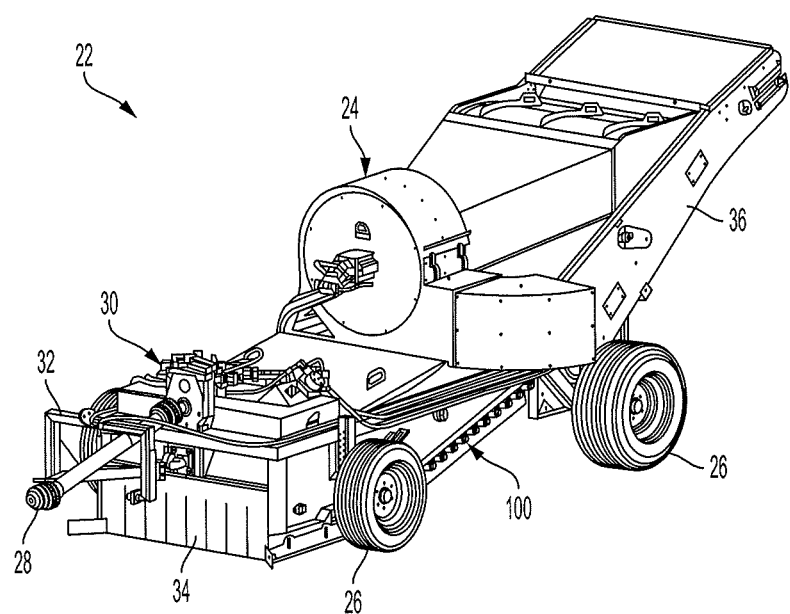
FIG. 1 is a perspective view of a harvester according to an exemplary embodiment.
Figure 2:
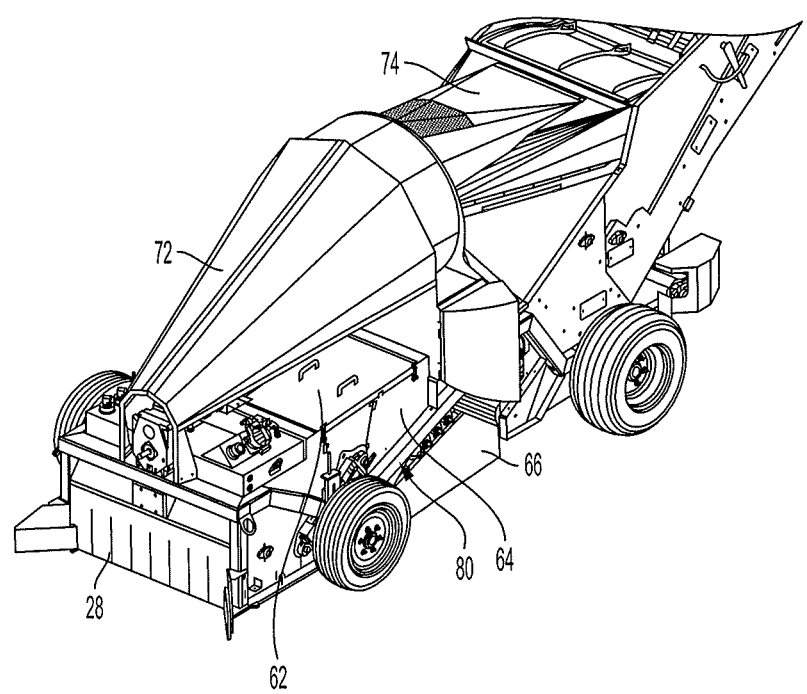
FIG. 2 is a perspective view of a harvester like FIG. 1 with covers.
Figure 3:
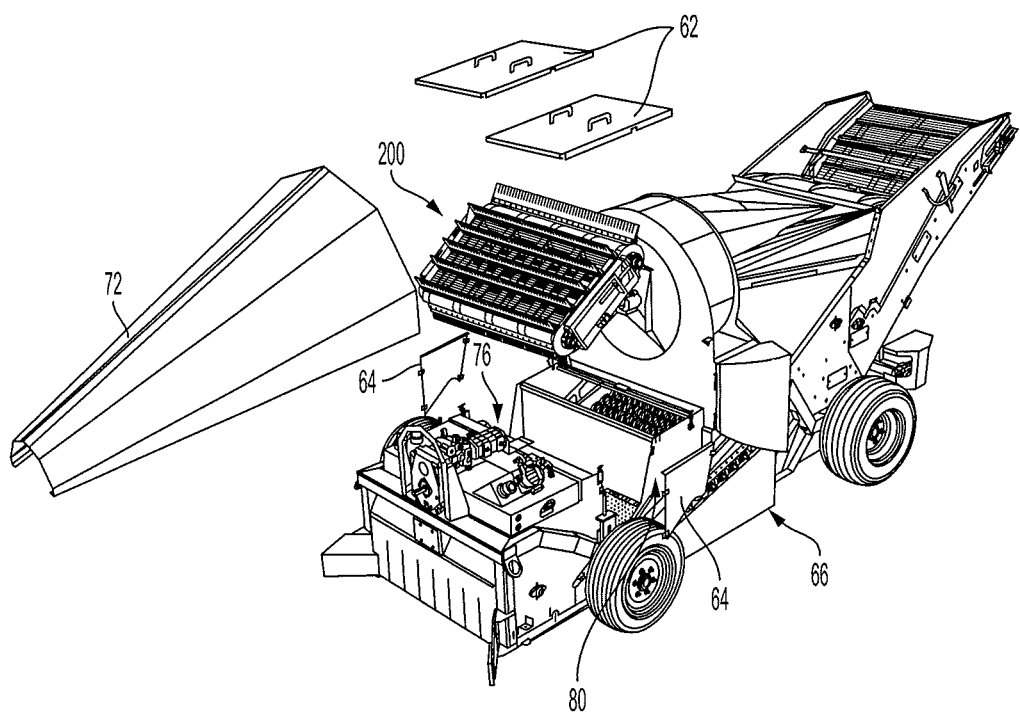
FIG. 3 is an exploded perspective view of the harvester of FIG. 2.

Refer now to FIG. 1, there being shown a harvester 22 according to an exemplary embodiment. The harvester 22 is pulled along a row of crop product, for example, tree nuts. The harvester 22 is connected to a towing vehicle (not pictured) by a hitch 32. Alternatively, the harvester 22 can be pushed or have its own drive motor. The harvester 22 includes a fan assembly 24, front and back wheels 26, a power take-off 28 for transferring mechanical energy from the towing vehicle engine, a hydraulic pump 30, a crop product collection mechanism 34, an exit conveyor 36, a removable pickup assembly 200 (FIG. 3), and a removable separator assembly 100.

The crop product is collected by the collection mechanism 34, which can be a rotating sweeper or other suitable collection mechanism. Alternatively, the crop product can be collected by another machine. A removable pickup assembly 200 is placed behind the collection mechanism 34 to pick up the collected crop.

After it is picked up, crop product is fed to the separator assembly 100. In the illustrated embodiment of FIG. 1, the separator assembly 100 is configured with a series of rollers, and may be referred to herein as a roller assembly. The '385 patent describes a known roller assembly. However, the roller assembly of the '385 patent is not readily replaced in the field like the separator assembly 100 of the present application, as will be discussed below. Another type of separator assembly is described below with respect to FIG. 14. The separator assembly 100 operates to separate the crop product from twigs, dirt, dust, and other debris, which may be referred to herein, collectively, as debris. The debris passes through the roller assembly 100, while the crop product stays above the removable roller assembly 100. The crop product is passed to the exit conveyor 36 to be collected with the rest of the separated crop product in a separate container or truck (not shown).

Figure 4:
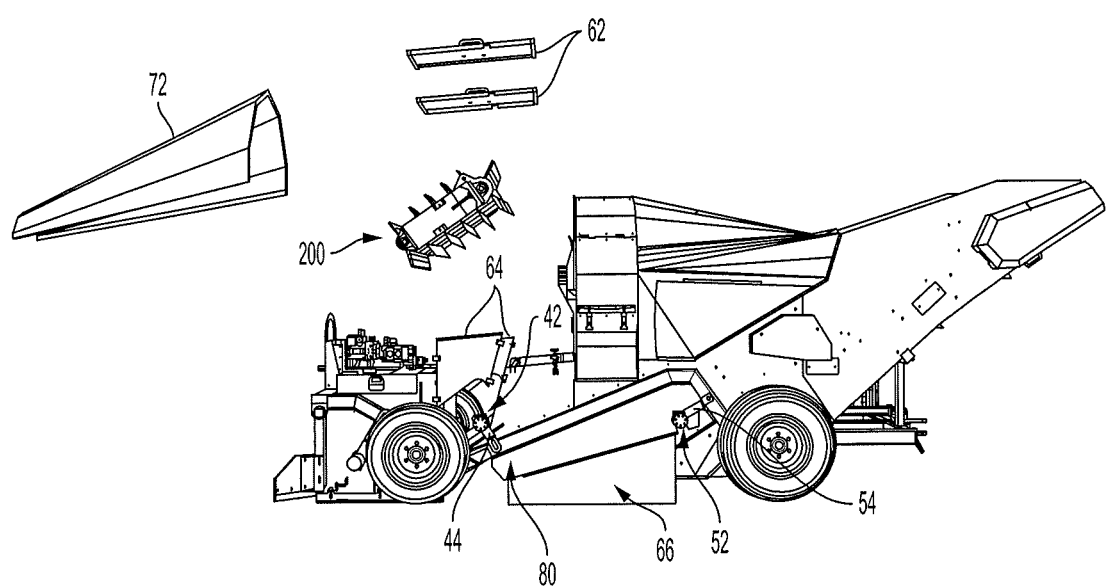
FIG. 4 is an exploded side view of the harvester of FIG. 3.

The harvester 22 has a power take-off 28 that drives a hydraulic pump 30. The hydraulic pump 30 drives, through the hydraulic tubing 31 (FIGS. 12, 16), a pickup assembly hydraulic motor 42 (FIG. 12) and a roller assembly hydraulic motor 52 (FIG. 4) that then, respectively, drives the removable pickup assembly 200 and the removable separator assembly 100. The hydraulic motors 42, 52 have a mechanical connection to at least one of the rotational shafts of the removable pickup assembly 200 and the removable separator assembly 100, respectively. In an example, each the hydraulic motors 42, 52 is co-axial with the connected rotational shafts, respectively. When the power take-off 28 is engaged, power is transferred from the towing vehicle (not pictured) to the rotational shafts through the power take-off 28, the hydraulic pump 30, the hydraulic tubing 31, and the hydraulic motors 42, 52.

In other embodiments, the harvester 22 can have its own power generation source, e.g., an engine or electric motor, that transfers its mechanical power to the rotational shafts. In this later embodiment, the harvester 22 does not require a power take-off connected to a towing vehicle.

Figure 5:
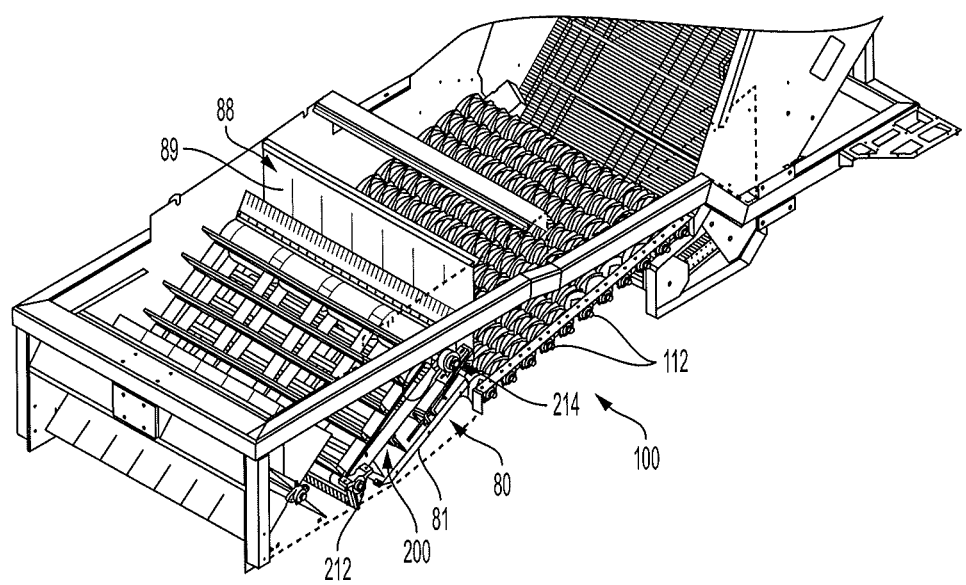
FIG. 5 is a perspective view of a pickup assembly and separator assembly of the harvester of FIG. 1.

Referring now to FIGS. 2, 3, 4, and 5, harvester 22 includes a top front cover 72 and top back cover 74 that cover a body frame 80 of the harvester 22. Inside a pickup compartment 76 of the body frame 80 is placed the removable pickup assembly 200, which may also be referred to as a removable pickup cassette. Inside a separator compartment 78 (FIG. 13) of the body frame 80 is placed the removable separator assembly 100, which may also be referred to as a removable separator cassette, or, in the illustrated embodiment, a removable roller assembly or cassette. In the embodiment of FIG. 5, the crops and debris collected by the removable pickup assembly 200 are transferred to the removable separator assembly 100. As shown, there is no mechanical interconnection between the removable pickup assembly 200 and the removable roller assembly 100 to maintain alignment or timing. The removable separator assembly 100 separates the crops from debris and exhausts the separated crops through the exit conveyor 36 of FIG. 1. A separation screen 88 with at least one opening 89 may optionally be placed between the pickup assembly 200 and the roller assembly 100 to align the crops and debris transferred to the roller assembly 100.

During operation, the removable pickup assembly 200 placed within the body frame 80 is covered by panels, e.g., top body panel 62, side upper body panel 64. The body panels 62 and 64 protect the removable pickup assembly 200 from external dust and other debris, for example, weather or materials kicked up by the towing vehicle that may damage the removable pickup assembly 200. The removable separator assembly 100 is also covered by panels, e.g., side lower body panel(s) 66. The panels 66 protect the removable separator assembly 100 from dust and debris that may damage the removable separator assembly 100 like that of removeable pickup assembly 200, and prevent additional dusts and debris landing on a surface of the removable separator assembly 100.

Figure 15:
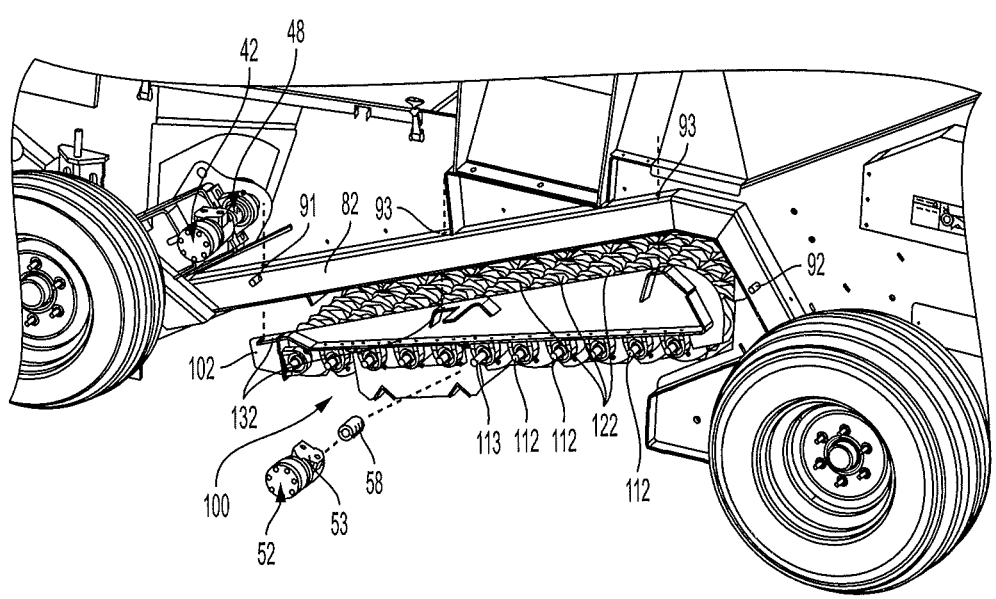
FIG. 15 is a perspective view of the roller assembly of FIG. 13 mounted to the harvester of FIG. 1.

The pickup assembly hydraulic motor 42 is mounted to the removable pickup assembly 200. In the illustrated embodiment, the pickup assembly hydraulic motor 42 is mounted to the removable pickup assembly 200 by being coupled to a pickup assembly drive shaft 214, which will be discussed below. The roller assembly hydraulic motor 52 is mounted to the removable roller assembly 100 by being coupled through coupler 58 to a roller assembly drive shaft 113 (FIG. 15). By mounting the hydraulic motors 42, 52 to the removable pickup assembly 200 and removable roller assembly 100, respectively, the hydraulic motors 42, 52 drive the removable pickup assembly 200 and removable roller assembly 100, respectively, without being mounted onto the harvester 22 body frame 80. That is, the pickup assembly hydraulic motor 42 and the roller assembly hydraulic motor 52 are not mounted on the harvester 22 body frame 80, but are instead mounted on the pickup assembly 200 and the removable roller assembly 100 directly.

Figure 12:
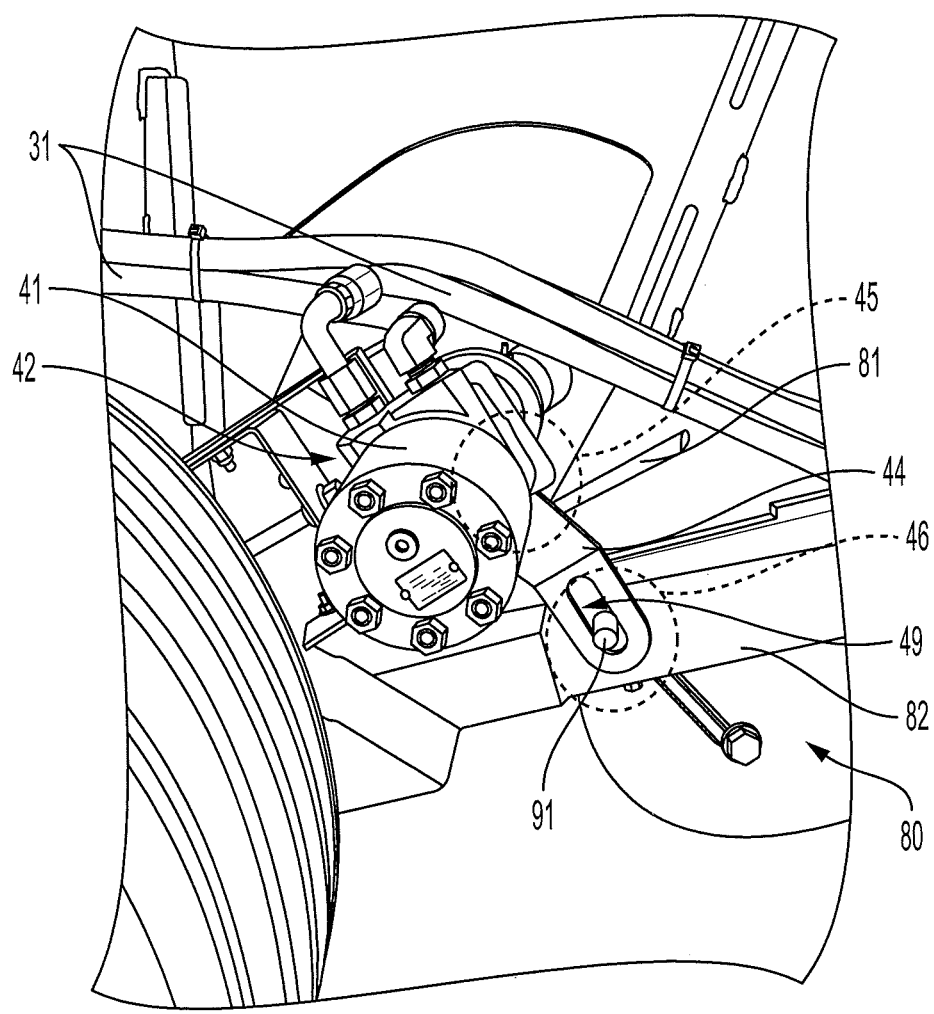
FIG. 12 is a perspective view of a first hydraulic motor coupled to the pickup assembly of FIG. 6, which is mounted to the harvester of FIG. 1.
Figure 16:
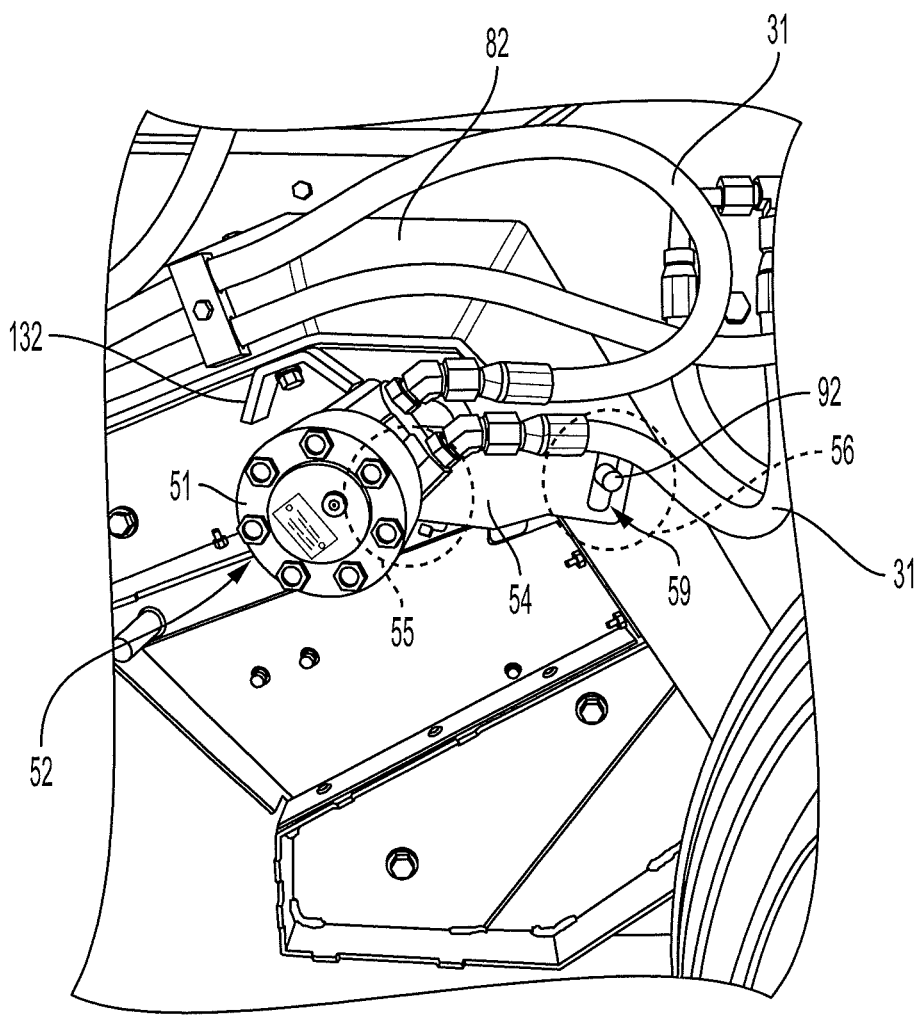
FIG. 16 is a perspective view of a second hydraulic motor coupled to the pickup assembly of FIG. 13, mounted to the harvester of FIG. 1

The housings 41, 51 of the pickup assembly hydraulic motor 42 and roller assembly hydraulic motor 52, respectively, are attached to a pickup assembly torque arm 44 and a roller assembly torque arm 54, respectively, each of which limits the housings 41, 51 of the respective hydraulic motor 42, 52 from excessive rotation while driving the respective assemblies (FIGS. 12, 16). The pickup assembly and roller assembly hydraulic motors 42, 52 drive the removable pickup assembly 200 and removable roller assembly 100, respectively, without the hydraulic motors 42, 52 being mounted onto the harvester 22 body frame 80. The pickup assembly torque arm 44 and the roller assembly torque arm 54 prevent excessive rotation of the respective hydraulic motors 42, 52 by engaging the slots 49, 59 of the torque arms 44, 54 with a respective pickup assembly torque arm pin 91 (FIG. 12) and a roller assembly torque arm pin 92 (FIG. 16), which will be discussed further below.

Figure 6:
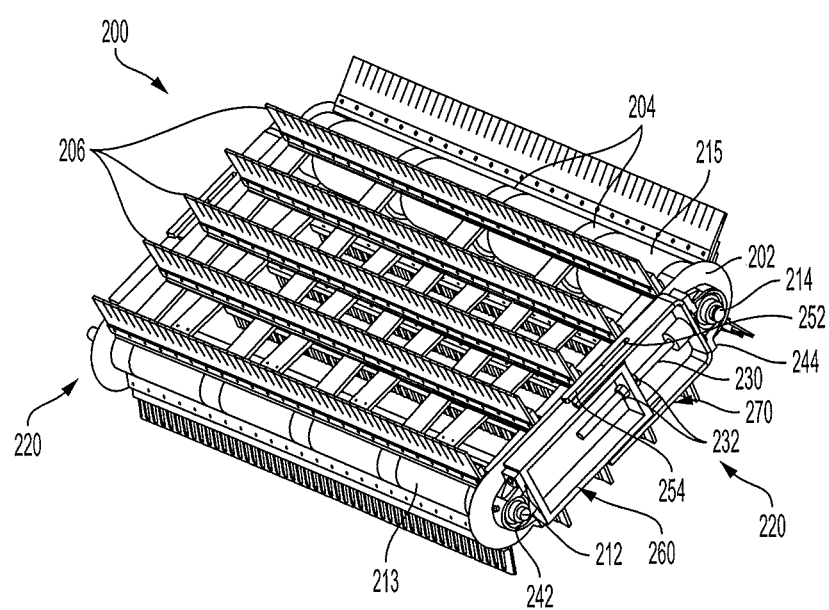
FIG. 6 is a perspective view of the pickup assembly of FIG. 5.
Figure 7:
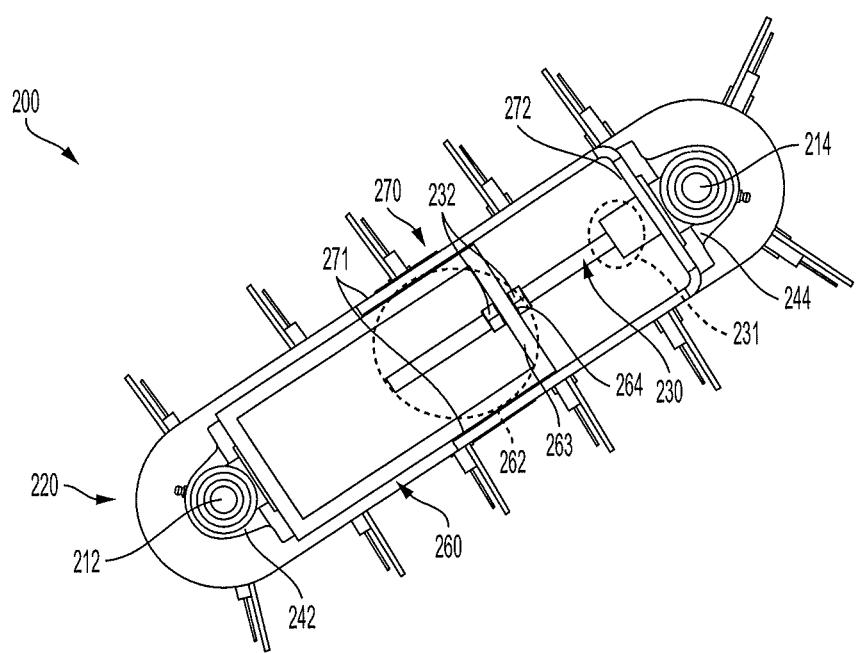
FIG. 7 is a side view of the pickup assembly of FIG. 5.

FIGS. 6 and 7 provide a perspective and side view of the removable pickup assembly 200 (or removable pickup cassette) according to an aspect of the present invention. The removable pickup assembly 200 includes two stretcher assemblies 220 separating and maintaining tension between a pickup assembly drive shaft 214 and a pickup assembly idle shaft 212. It should be noted that only one side of the removable pickup assembly 200, i.e., one stretcher assembly 220, is discussed and that structurally, the other stretcher assembly 220 has comparable features.

Each of pickup assembly drive shaft 214 and pickup assembly idle shaft 212 may optionally include a shaft cover, e.g., pickup assembly drive shaft cover 215 and pickup assembly idle shaft cover 213, respectively, to provide a suitable dimension and surface for driving and idling one or more belts 204 wrapped around a pickup assembly drive shaft 214 and pickup assembly idle shaft 212. For example, pickup assembly drive shaft cover 215 and pickup assembly idle shaft cover 213 may each include a rubberized material or the like with suitable friction to prevent the belts 204 from slipping. During operation, as the pickup assembly hydraulic motor 42 mounted to the pickup assembly drive shaft 214 drives the rotation of the pickup assembly drive shaft 214, the belts 204 rotate around the removable pickup assembly 200 idling around pickup assembly idle shaft 212. One or more brushes 206 are positioned about perpendicular to a moving direction of the belt(s) 204, spaced periodically around the belts 204. The brushes 206 pick up the crop products and move the collected products to the removable roller assembly 100. The brushes 206 are constructed as known in the art, and may be comprised of a rubber or plastic, or other pliable material, fiber, or fabric, to assist the collection and movement of crop products. For example, in one example the "brushes" 206 may be slit rubber pieces backed by metal tine for strength or other suitable material.

Stretcher assembly 220 supports the pickup assembly drive shaft 214 and pickup assembly idle shaft 212 and tensions the belts 204 by adjusting the distance between shafts 214, 212. The stretcher assembly 220 includes a closed bracket 260, an open bracket 270, a stretcher rod 230 with matching stretcher nut(s) 232, and stretcher plate 202 on which the closed bracket 260 and the open bracket 270 are mounted. Stretcher plate 202 prevents external debris from fouling the removable pickup assembly 200 and also serves to maintain the belts 204 in position. The stretcher plate may be formed of one or more components or in corporate clearances, for example, to allow adjustments of the brackets 260, 270.

The pickup assembly idle shaft and pickup assembly drive shafts 212, 214 are rotatably mounted onto the stretcher plate 202, and are secured to the closed bracket 260 and open bracket 270 with an idle shaft bearing block 242 and drive shaft bearing block 244, respectively, that act as a bearing surface for the respective shafts. Each of idle bearing block 242 and drive bearing block 244 may include ball bearings or similar bearing surfaces within the respective bearing blocks 244. The idle shaft and drive shaft bearing blocks 242, 244 may be fastened onto the closed and open brackets 260, 270, respectively, using a suitable fastener, removable or permanent. The pickup assembly idle shaft and pickup assembly drive shafts 212, 214 are able to rotate within the idle and drive bearing blocks 242, 244, respectively. The rotation causes the brushes 206 to travel around the removable pickup assembly 200.

The open bracket 280 includes open arms 271 surrounding at least one end 262 of the closed bracket 260. The relative position of the closed bracket 260 and the open bracket 270 can be adjusted by manipulating the stretcher rod 230. One end 231 of the stretcher rod 230 is attached to a middle section 272 of the open bracket 280 between the open arms 271 and penetrates the surrounded end 262 of the closed bracket 260 via an opening 264 in a middle section 263 of the surrounded end 262. The matching stretcher nuts 232 are placed on the stretcher rod 230 on both sides of the opening 264 of the closed bracket 260. The stretcher rod 230 may be, for example, a threaded rod that, when rotated in corresponding nuts 232, causes the distance between the pickup assembly drive shaft 214 and pickup assembly idle shaft 212 to change. Alternative stretcher rod mechanisms may also be suitable such as, for example, a hydraulic pneumatic piston, so long as it is capable of maintaining suitable tension. Because the stretcher assembly 220 is able to maintain tension between the pickup assembly drive shaft 214 and pickup assembly idle shaft 212 when not inserted into a harvester, the removable pickup assembly 200 (cassette) may be pre-tensioned in a favorable work environment in advance of installation, which decreases the time it takes to replace the pickup assembly and ultimately reducing the out-of-service-time of the harvester.

The closed and open brackets 260, 270 may include a guide for maintaining the brackets 260, 270 relatively co-planer. For example, as shown in FIG. 6, the open bracket 270 includes a slot 252 and the closed bracket 260 includes a slot insert 254, or pin, to be inserted into the slot 252 of the open bracket 270 to maintain a co-planer alignment of the open bracket 270 in relation to the closed bracket 260.

Figure 8:
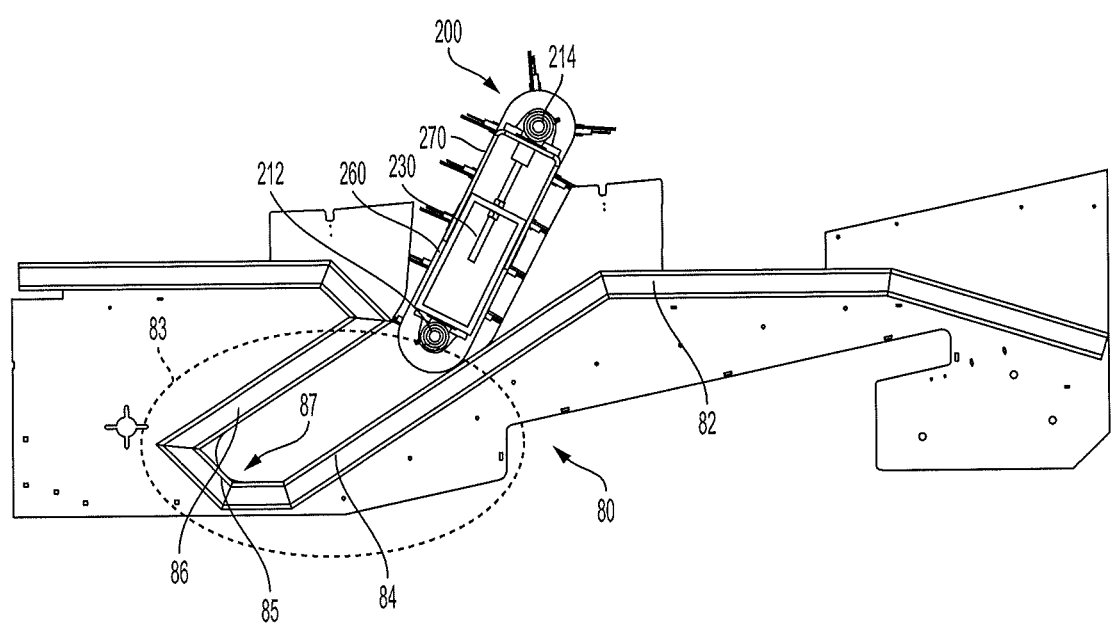
FIG. 8 is a side view of the pickup assembly of FIG. 6 inserted into the harvester of FIG. 1.
Figure 9:
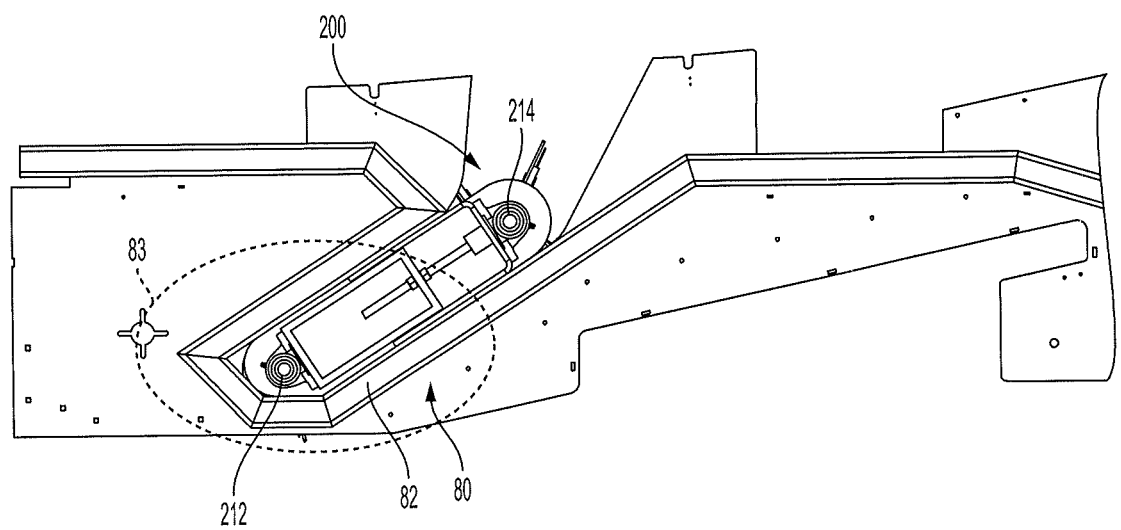
FIG. 9 is a side view of the pickup assembly of FIG. 6 inserted into the harvester of FIG. 1.
Figure 10:
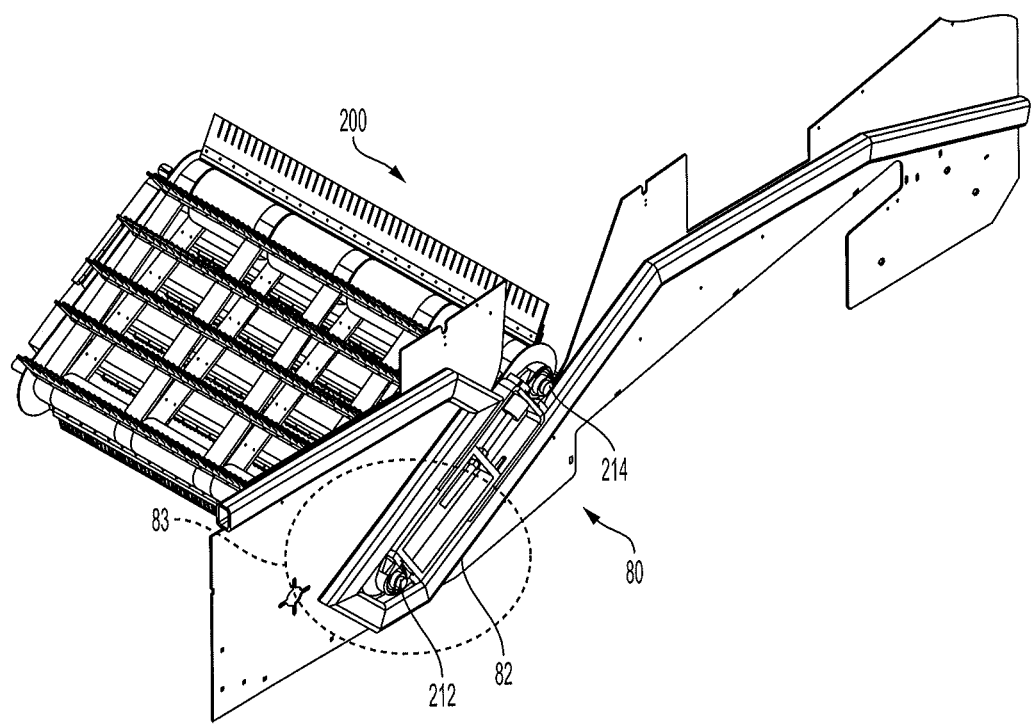
FIG. 10 is a perspective view of the pickup assembly of FIG. 6 inserted into the harvester of FIG. 1.

FIGS. 8, 9, and 10 illustrate the placement of the pickup assembly 200 within the body frame 80 of the harvester 22. The body frame 80 includes a mounting rail 82 formed on an outer surface of a side frame of the body frame 80. While the body frame is shown in segments, the body frame may also be continuous frame or be made of joined, e.g., welded, segments. A portion of the mounting rail 82 forms an inclined slot 83 dimensioned to removably receive the removable pickup assembly 200. The incline of the inclined slot 83 allows the pickup assembly 200 to be easily slid into the inclined slot 83 as a single unit and lifted out of the inclined slot 83 as a single unit for replacement.

As such, an out of service removable pickup assembly 200 may be removed and a new or repaired removable pickup assembly may be inserted without significant downtime to the harvester. Out of service removable pickup assembly 200 may then be repaired after the harvester is returned to service with a new removable pickup assembly 200. The out of service removable pickup assembly 200 may be transferred to a workshop or other suitable safe location to have the worn parts, e.g., belts 204 or brushes 206, replaced in a more work friendly environment and stored for a next replacement. As the removable pickup assembly 200 glides into and out of the inclined slot 83, it is guided and supported by an inclined slot bottom surface 84, inclined slot top surface 86, and inclined slot curve surface 85 of the inclined slot 83. The body frame 80 further comprises an opening 87, the edges of which are shaped to accommodate the removable pickup assembly 200 inserted into the inclined slot 83. FIGS. 9 and 10 illustrate the removable pickup assembly 200 inserted into the inclined slot 83.

Figure 11:
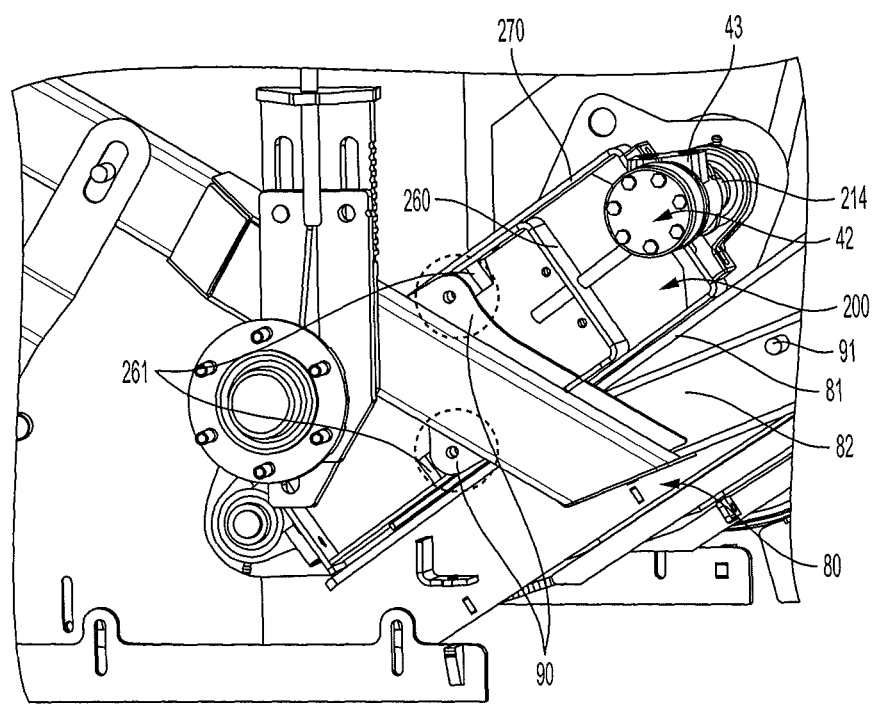
FIG. 11 is a perspective view of the pickup assembly of FIG. 6 mounted to the harvester of FIG. 1.

FIGS. 11 and 12 illustrate the removable pickup assembly 200 releasably mounted to the body frame 80 of the harvester 22 according to an aspect of the present invention. In particular, in FIG. 11, the removable pickup assembly 200 rests on a pickup assembly support 81 that may be formed on the body frame 80 in addition to the inclined slot 83. In another alternative, the inclined slot 83 itself may be the support and guidance to the pickup assembly 200 without the pickup assembly support 81. The pickup assembly support 81 may be made of a material and configured to suitably support the removable pickup assembly 200. For example, the pickup assembly support 81 may be a bent-out flange or a portion metal, such as the frame, jogged out or ribbed for additional strength.

The removable pickup assembly 200 received by the body frame 80 is releasably mounted onto one or more holes of the body frame 80, or as shown in FIG. 11, a hole of a mounting ear 90 formed on the mounting rail 82. In the embodiment of FIG. 11, a bolt may be inserted through the hole of the mounting ear 90 and into a threaded attachment block 261 formed on the closed bracket 260 to mount the removable pickup assembly 200 to the body frame 80.

As illustrated in FIG. 11, the pickup assembly hydraulic motor 42 is mounted to the pickup assembly drive shaft 214 via a pickup assembly motor coupler (FIG. 15), which is similar to the separator assembly motor coupler 58, also referred to as a shaft coupler, discussed with reference to FIG. 15, below. Pickup assembly motor coupler may be a standard shaft couple, for example, those supplied from Climax Metal Products Company of Mentor, Ohio.

The pickup assembly hydraulic motor 42 may further include a pickup assembly hydraulic motor power connect 43 including an inlet and outlet port to house the hydraulic lines supplying high and low pressure hydraulic fluids, respectively. Pickup assembly hydraulic motor 42, as well roller assembly hydraulic motor 52 (discussed below), may each be typical hydraulic motors used in the industry, for example, those supplied by: White Drive Products, Inc of Hopkinsville, Ky.; Danfoss; and Bosch Rexroth Corporation. When the high pressure hydraulic fluid is supplied to the pickup assembly hydraulic motor 42, the pickup assembly hydraulic motor 42 drives the pickup assembly drive shaft 214 to rotate.

When preparing to remove the removable pickup assembly 200 from the harvester 22, the pickup assembly hydraulic motor 42 is decoupled from the pickup assembly drive shaft 214. As such, the pickup assembly hydraulic motor 42 is not internal or part of the pickup assembly drive shaft 214. When the removable pickup assembly 200 is lifted up from the inclined slot 83 and removed from the body frame 80, the pickup assembly hydraulic motor 42 remains connected to the hydraulic lines. After the new replacement removable pickup assembly 200 is dropped into the inclined slot 83, the pickup assembly hydraulic motor 42 is mounted to the new replacement removable pickup assembly 200 by being coupled to the pickup assembly drive shaft 214 of the new replacement removable pickup assembly 200. The pickup assembly hydraulic motor 42 is external to the pickup assembly drive shaft 214 and not internal so that the removable pickup assembly 200 may be easily removed from the nut harvester and replaced without having to remove the pickup assembly hydraulic motor 42 with the removable pickup assembly 200.

Also shown in FIGS. 11 and 12 is a pickup assembly torque arm pin 91 to be inserted into a pickup assembly torque arm slot 49. The pickup assembly torque arm slot 49 is formed at a slot end 46 of the pickup assembly torque arm 44, which is an opposite end to a mounting end 45 of the pickup assembly torque arm 44, which is connected to the pickup assembly hydraulic motor 42. In the embodiment of FIG. 12, the opening of the pickup assembly torque arm slot 49 is wider than a size of the pickup assembly torque arm pin 91.

The pickup assembly torque arm 44, in combination with the pickup assembly torque arm slot 49, and pickup assembly torque arm pin 91 are adapted to tolerate a range of movement of the pickup assembly hydraulic motor 42 occurring during the normal operation of the harvester 22 in the field while retaining the relative position of the pickup assembly hydraulic motor 42 in relation to the removable pickup assembly 200. In an alternative, the pickup assembly toque arm 44 and/or the roller assembly torque arm 54 (discussed below), are made from a flexible material or is of a configuration that can undergo elastic deformation such that they may absorb rotational shock and permit some flexibility while providing a rotational anchor for the respective motors 42, 52. The tolerance provides reasonable tension to a structure of the harvester 22, and its components, and allows the harvester 22 to accommodate, absorb, and dissipate minor movement, vibration, and shocks caused by the physical movements of the harvester 22 and pickup assembly 200, particularly during operation, and prevents damages or cracks that may otherwise occur if the pickup assembly hydraulic motor 42 were mounted directly to the body frame of another harvester.

The wider opening of the pickup assembly torque arm slot 49 allows for manufacturing tolerances and for using the removable pickup assembly 200 in harvesters 22 with different sizes of pickup assembly torque arm pin 91. The opening of the pickup assembly torque arm slot 49 is also elongated to tolerate a movement of the pickup assembly hydraulic motor 42 parallel to the pickup assembly torque arm pin 91. It should be noted that the orientation and shape of the pickup assembly torque arm slot 49 may be adjusted to provide for tolerances in different dimensions as well to assist for movement of the removable pickup assembly 200 in different directions.

Figure 13:
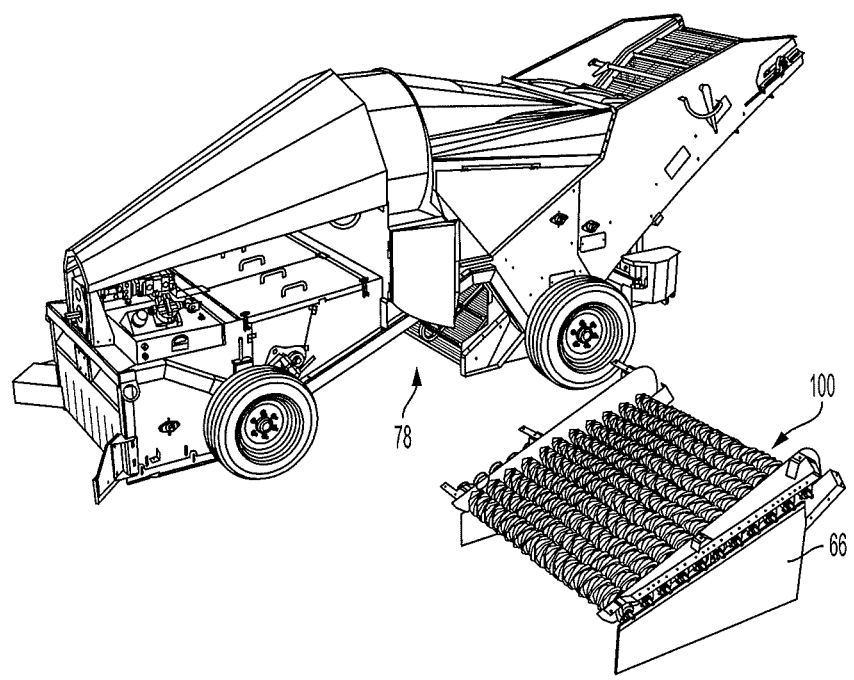
FIG. 13 is an exploded perspective view of the separator assembly of FIG. 5.
Figure 14:
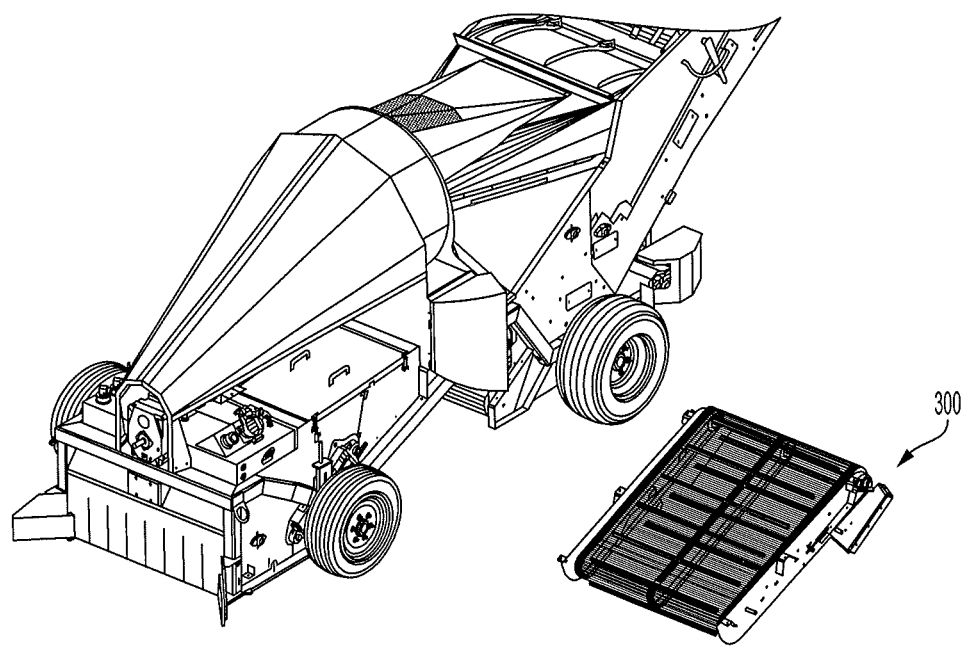
FIG. 14 is an exploded perspective view of an alternative separator assembly according to an exemplary embodiment.

FIG. 13 illustrates an exploded view of a removable separator assembly 100 having rollers and harvester 22 according to an aspect of the present invention. FIG. 14 illustrates an exploded view of a removable twin-rod type separator assembly 300 and harvester 22 according to an aspect of the present invention. The removable roller assembly 100 of FIG. 13, and the twin-rod type separator assembly 300 of FIG. 14, may be mounted onto the body frame 80 of the harvester 22 according to an example shown in FIGS. 15 and 16. In particular, the removable roller assembly 100 of FIG. 13 may have certain rolling features, for example those features described in U.S. Pat. Nos. 8,683,918, and 10,111,385. Regardless of the screening/roller/twin rod configuration used for separation, the particular separator features are combined into a similar assembly having features discussed above with respect to the removable pickup assembly 200. That is, the removable separator assembly 100, shown configured with rollers, or the removable separator assembly 300, shown with a twin-rod configuration, is a cassette that may be removed and installed as a single pre-configured unit. Body panel, e.g., side lower body panel 66, may cover the removable roller assembly 100 or the removable twin-rod type separator assembly 300 mounted onto the body frame 80.

FIGS. 15 and 16 illustrate an embodiment of the removable roller assembly 100 mounted onto the body frame 80 of the harvester 22. It should be noted that only one side of the removable roller assembly 100 mounted to the body frame 80 is discussed and that structurally, the other side of the removable roller assembly has comparable features. According to an aspect of the present invention, one or more matching mounting holes may be formed on the removable roller assembly 100 and the mounting rail 82 to receive a releasably engageable fastener to mount the removable roller assembly 100 to the mounting rail 80. In the embodiment of FIG. 15, the removable roller assembly 100 is mounted onto the mounting rail 82 by fastening an attachment surface 132 (e.g., bracket) of the removable roller assembly 100 onto a mounting slot 93 formed in the mounting rail 82 using a conventional fastening mechanism such as bolts and nuts, or other releasably engaging fasteners. Other means of releasably mounting may also be utilized to mount the removable roller assembly 100 to the body frame 80, for example, a tension clamp or the like.

An exemplary removable roller assembly 100 of FIGS. 15 and 16 includes a side plate 102, at least one roller assembly shafts 112, and at least two disks 122 mounted on each of the at least two roller assembly shafts 112. The roller assembly shafts 112 are rotatably mounted onto the side plate 102. The side plate 102 prevents external debris from fouling the removable roller assembly 100 and also serves to maintain the roller assembly shafts 112 in position. In the embodiment of FIG. 15, the attachment surface 132 is formed on the side plate 102. Details of example disk configurations and variations thereof, which are internal to the removable roller assembly, may be found, for example, in U.S. Pat. Nos. 8,683,918 and 10,111,385.

The roller assembly hydraulic motor 52 is mounted on the removable roller assembly 100 and mechanically coupled to a roller assembly drive shaft 113 via a motor coupler 58. When hydraulic fluid is supplied to the roller assembly hydraulic motor 52 via an inlet and retuned through the outlet port of the roller assembly hydraulic motor power connect 53, through hydraulic lines 31, the roller assembly hydraulic motor 52 rotates the roller assembly drive shaft 113, which in turn rotates the roller assembly shafts 112 and disks 122 to separate the collected crops from debris.

In preparation for removing the removable roller assembly 100 for replacement, the roller assembly hydraulic motor 52 is decoupled from the roller assembly drive shaft 113. When the removable roller assembly 100 is removed from the body frame 80, the roller assembly hydraulic motor 52 remains connected to the hydraulic lines. After the new replacement removable roller assembly 100 is mounted onto the body frame 80, the roller assembly hydraulic motor 52 is mounted to the new replacement removable roller assembly 100 by being coupled to the roller assembly drive shaft 113 of the new replacement removable roller assembly 100. The roller assembly hydraulic motor 52 is external to the roller assembly drive shaft 113 and not internal so that the removable roller assembly 100 may be easily removed from the nut harvester 22 and replaced without having to remove the roller assembly hydraulic motor 52 with the removable roller assembly 100.

Also shown in FIG. 16 is a roller assembly torque arm pin 92 formed on the mounting rail 82, which is inserted into a roller assembly torque arm slot 59 formed on a slot end 56 of the roller assembly torque arm 54. A mounting end 55 of the roller assembly torque arm 54 is connected to the roller assembly hydraulic motor 52 and is opposite to the slot end 56 of the roller assembly torque arm slot 59. In the example of FIG. 16, the opening of the roller assembly torque arm slot 59 is wider than a size of the roller assembly torque arm pin 92. The wider opening of the roller assembly torque arm slot 59 allows for manufacturing tolerances and the other features discussed above with respect to the removable pickup assembly 200. For example, the roller assembly torque arm slot 59 may be used with different sizes of roller assembly torque arm pins 92. The opening of the roller assembly torque arm slot 59 is also elongated to tolerate movement of the roller assembly hydraulic motor 52 perpendicular to the roller assembly torque arm pin 92.

The roller assembly torque arm 54, roller assembly torque arm slot 59, and roller assembly torque arm pin 92 have similar features to the pickup assembly torque arm 44, pickup assembly torque arm slot 49, and pickup assembly torque arm pin 91 discussed above with respect to the removable pickup assembly 200 and have similar advantages. In the embodiments of FIGS. 12 and 16, the pickup assembly torque arm pin 91 and roller assembly torque arm pin 92 are formed on a sidewall surface of the body frame and respectively inserted into the pickup assembly torque arm slot 49 and roller assembly torque arm slot 59, respectively, allowing the pickup assembly torque arm 44 and roller assembly torque arm 54, respectively, to "float" on the pickup assembly torque arm pin 91 and roller assembly torque arm pin 92.

To replace the removable pickup assembly 200, the pickup assembly hydraulic motor 42 mounted to the pickup assembly drive shaft 214 is decoupled from the pickup assembly drive shaft 214, while the pickup assembly hydraulic motor 42 remains connected to the hydraulic tubing 31. Optionally, the pickup assembly torque arm slot 49 may be lifted from the pickup assembly torque arm pin 91. The removable pickup assembly 200 is decoupled from the frame 80 by removing the appropriate fastener(s). For example, the attachment blocks 261 (FIG. 11) of the closed bracket 260 is unfastened from the mounting ear 90 of the mounting rail 82. In addition, top body panel(s) 62 and side upper body panel(s) 64 are removed from the body frame 80. Thereafter, the removable pickup assembly 200 is removed, for example lifted up, from the inclined slot 83 and out of the pickup compartment 76. A new removable pickup assembly 200 is then placed into the inclined slot and into the pickup compartment 76. The top body panel 62 and the side upper body panel 64 are added to cover the new removable pickup assembly 200, and the attachment block(s) 261 of the new removable pickup assembly 200 are fastened to the mounting ear(s) 90. The pickup assembly hydraulic motor 42 is also coupled to the pickup assembly drive shaft 214 of the new removable pickup assembly 200, and, if removed, the pickup assembly torque arm pin 91 is re-inserted into the pickup assembly torque arm slot 49.

To replace the removable separator assembly 100, the roller assembly hydraulic motor 52 is decoupled from the roller assembly drive shaft 113, while the roller assembly hydraulic motor 52 is still connected to the hydraulic tubing 31. Optionally, the roller assembly torque arm slot 59 may be lifted from the roller assembly torque arm pin 92. The removable separator assembly 100 is decoupled from the frame 80 by removing the appropriate fastener(s). For example, the attachment surface(s) 132 of the roller assembly 100 is unfastened from the mounting slot(s) 93 of the mounting rail 82. The side lower body panel(s) 66 are removed from the body frame 80. Thereafter, the removable roller assembly 100 is removed from the separator compartment 78. A new removable roller assembly 100 is paced into the separator compartment 78. The side lower body panel(s) 66 covers the new removable roller assembly 100, and the attachment surface 132 of the new removable roller assembly 100 is fastened to the mounting slot(s) 93 of the mounting rail 82. The roller assembly hydraulic motor 52 is coupled to the roller assembly drive shaft 113 of the new removable roller assembly 100 via the motor coupler 58, and, if removed, the roller assembly torque arm pin 92 is inserted into the roller assembly torque arm slot 59.

The apparatus and methods of the present disclosure offer improvements in crop product harvesting by allowing for more efficient crop harvesting. The efficiency is gained by decreasing the out of service time associated with repairing pickup and separation configurations. The ability to remove and reinstall a cassette of, for example, a removable pickup assembly 200 and/or a removable roller assembly 100 allows for the units to be pre-configured and refurbished without taking the harvester out of service. The advantage of being able to remove and replace the removable pickup assembly 200 and removable roller assembly 100 quickly allows for the harvester to return to service with limited down-time and for maintenance on the assemblies to be completed in a more ideal work environment with access to appropriate tools and shelter as opposed to the need for field repairs of the equipment.

The above description and drawings are only illustrative of preferred embodiments, and are not intended to be limiting. Features described with a single aspect or embodiment of this disclosure may also be use with other aspects or embodiments of this disclosure where appropriate. Any subject matter or modification thereof which comes within the spirit and scope of the following claims is to be considered part of the present inventions.

What is claimed as new and desired to be protected by Letters Patent of the United States is:

1. A nut harvester comprising:
   a body frame;
   a pickup assembly motor;
   a pickup assembly torque arm connected to the pickup assembly motor, the pickup assembly torque arm including a pickup assembly torque arm slot; and
   at least one removable assembly, wherein the at least one removable assembly is a removeable pickup assembly and the removeable pickup assembly comprises:
      a pickup assembly drive shaft;
      a pickup assembly idle shaft;
      a belt wrapped around the pickup assembly drive shaft and the pickup assembly idle shaft; and
      a stretcher assembly providing tension and support to the pickup assembly drive shaft and the pickup assembly idle shaft, wherein the stretcher assembly comprises:
         a stretcher assembly side plate adapted for mounting the pickup assembly drive shaft and the pickup assembly idle shaft to the stretcher assembly side plate;
         a closed bracket attached to the stretcher assembly side plate and to which the pickup assembly idle shaft is secured via an idle shaft bearing block;
         an open bracket attached to the stretcher assembly side plate and to which the pickup assembly drive shaft is secured via a drive shaft bearing block; and
         a stretcher rod penetrating the closed bracket and attached to the open bracket.

2. The nut harvester of claim 1, further comprising a removeable separator assembly.

3. The nut harvester of claim 1, wherein the stretcher assembly comprises a stretcher nut adapted to engage the stretcher rod such that rotation of the stretcher rod adjusts the distance between the closed bracket and the open bracket to adjust the tension between the pickup assembly idle shaft and the pickup assembly drive shaft.

4. The nut harvester of claim 1, wherein the pickup assembly motor is a pickup assembly hydraulic motor.

5. The nut harvester of claim 1, wherein the pickup assembly torque arm comprises:
   a pickup assembly torque arm mounting end attached to the pickup assembly motor; and
   a pickup assembly torque arm slot end in which the pickup assembly torque arm slot is formed,
   wherein an opening of the pickup assembly torque arm slot is wider than a size of a pickup assembly torque arm pin inserted into the pickup assembly torque arm slot.

6. The nut harvester of claim 5, wherein the pickup assembly torque arm slot is elongated to tolerate a movement of the pickup assembly motor with respect to the pickup assembly torque arm pin.

7. A nut harvester comprising:
   a body frame;
   a pickup assembly motor;
   at least one removable assembly, wherein the at least one removable assembly is a removeable pickup assembly and the removeable pickup assembly comprises:
      a pickup assembly drive shaft;
      a pickup assembly idle shaft;
      a belt wrapped around the pickup assembly drive shaft and the pickup assembly idle shaft; and
      a stretcher assembly providing tension and support to the pickup assembly drive shaft and the pickup assembly idle shaft, wherein the stretcher assembly comprises:
         a stretcher assembly side plate adapted for mounting the pickup assembly drive shaft and the pickup assembly idle shaft to the stretcher assembly side plate;
         a closed bracket attached to the stretcher assembly side plate and to which the pickup assembly idle shaft is secured via an idle shaft bearing block;
         an open bracket attached to the stretcher assembly side plate and to which the pickup assembly drive shaft is secured via a drive shaft bearing block; and
         a stretcher rod penetrating the closed bracket and attached to the open bracket,
   and; a pickup assembly motor coupler coupling the pickup assembly motor to the pickup assembly drive shaft.

8. The nut harvester of claim 2, wherein the removable separator assembly comprises:
   a separator assembly side plate,
   a separator assembly drive shaft, and
   at least one separator assembly shafts.

9. The nut harvester of claim 8, wherein the removable separator assembly comprises at least two disks mounted on each of the at least one separator assembly shafts.

10. The nut harvester of claim 8, further comprising a separator assembly motor.

11. The nut harvester of claim 10, wherein the separator assembly motor is a separator assembly hydraulic motor.

12. A nut harvester comprising:
    a body frame;
    at least one removable assembly, wherein the at least one removable assembly is a removeable pickup assembly;
    a separator assembly motor;
    a removeable separator assembly, wherein the removable separator assembly comprises:
       a separator assembly side plate,
       a separator assembly drive shaft, and
       at least one separator assembly shafts
    and; a separator assembly torque arm connected to the separator assembly motor, the separator assembly torque arm including a separator assembly torque arm slot.

13. The nut harvester of claim 12, wherein the separator assembly torque arm comprises:
    a separator assembly torque arm mounting end attached to the separator assembly motor; and
    a separator assembly torque arm slot end in which the separator assembly torque arm slot is formed,
    wherein an opening of the separator assembly torque arm slot is wider than a size of a separator assembly torque arm pin inserted into the separator assembly torque arm slot.

14. The nut harvester of claim 13, wherein the separator assembly torque arm slot is elongated to tolerate a movement of the separator assembly motor with respect to the roller assembly torque arm pin.

15. A nut harvester comprising:
    a body frame;
    at least one removable assembly, wherein the at least one removable assembly is a removeable pickup assembly;

a separator assembly motor;
  a removeable separator assembly, wherein the removable separator assembly comprises:
    a separator assembly side plate,
    a separator assembly drive shaft, and
    at least one separator assembly shafts
and; a separator assembly motor coupler coupling the separator assembly motor to the separator assembly drive shaft.

16. The nut harvester of claim 5, wherein the body frame further comprises;
  a pickup assembly support on which the removable pickup assembly is adapted to rest, and
  a mounting rail,
  wherein the mounting rail comprises:
    an inclined slot adapted to receive the removable pickup assembly; and,
    the pickup assembly torque arm pin.

17. The nut harvester of claim 16, wherein the frame further comprises a mounting ear to which the stretcher assembly is removably mounted and a mounting slot to which an attachment surface formed on the stretcher assembly side plate is removably mounted.

18. The nut harvester of claim 16, further comprising a separator assembly torque arm pin for insertion into a separator assembly torque arm.

19. A method of replacing at least one removable assembly, wherein the at least one removable assembly is a removeable pickup assembly, the method comprising:
  decoupling a motor from a shaft of the removable assembly;
  removing the removable assembly from a nut harvester by unmounting the removable assembly from a body frame of the nut harvester;
  mounting a replacement removable assembly to the body frame; and
  coupling the motor to a shaft of the replacement removable assembly.

20. The method of claim 19, further comprising removing one or more cover panels from the body frame of the nut harvester.

21. The method of claim 19, wherein the motor is a hydraulic motor.

22. The method of claim 19, wherein the step of removing the removable assembly comprises, lifting up the unmounted removable assembly from an inclined slot formed on the body frame and removing the lifted up removable assembly out of the nut harvester.

23. The method of claim 22, wherein the step of mounting of the replacement removable assembly further comprises placing the replacement removable assembly into the inclined slot before removably mounting the replacement removable assembly to the body frame.

24. The nut harvester of claim 1,
  wherein the body frame comprises sidewalls, the sidewalls having inclined slots adapted to receive the at least one removable assembly for mounting in the body frame by the inclined slots, so that the at least one removable assembly is adapted to be lifted up and out and a replacement removable assembly dropped into its place.

* * * * *